(12) United States Patent
Pastoor et al.

(10) Patent No.: US 11,884,216 B2
(45) Date of Patent: Jan. 30, 2024

(54) VEHICULAR FULL MIRROR DISPLAY SYSTEM WITH AUXILIARY FORWARD AND REARWARD VIEWS

(71) Applicant: Magna Mirrors of America, Inc., Holland, MI (US)

(72) Inventors: Nathan J. Pastoor, Jenison, MI (US); Peter J. Spencley, Jr., Holland, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 174 days.

(21) Appl. No.: 17/451,002

(22) Filed: Oct. 15, 2021

(65) Prior Publication Data

US 2022/0118915 A1 Apr. 21, 2022

Related U.S. Application Data

(60) Provisional application No. 63/198,412, filed on Oct. 16, 2020.

(51) Int. Cl.
*B60R 11/04* (2006.01)
*B60R 1/08* (2006.01)
(Continued)

(52) U.S. Cl.
CPC .............. *B60R 11/04* (2013.01); *B60R 1/08* (2013.01); *H04N 7/181* (2013.01); *B60R 2001/1253* (2013.01)

(58) Field of Classification Search
CPC ... B60R 11/04; B60R 1/08; B60R 2001/1253; B60R 1/081; B60R 11/0235; B60R 2011/0007; B60R 2300/607; B60R 2300/8026; B60R 2300/8046; B60R 2300/806; B60R 2001/1215;
(Continued)

(56) References Cited

U.S. PATENT DOCUMENTS 2,263,382 A 11/1941 Gotzinger
2,580,014 A 12/1951 Gazda
(Continued)

FOREIGN PATENT DOCUMENTS

WO 2022150826 A1 7/2022

*Primary Examiner* — Christopher S Kelley
*Assistant Examiner* — Asmamaw G Tarko
(74) *Attorney, Agent, or Firm* — HONIGMAN LLP

(57) ABSTRACT

A vehicular display system includes an electronic control unit (ECU), a plurality of cameras including a driver-side rear corner camera and a passenger-side rear corner camera disposed at respective driver-side and passenger-side rear corner regions of the vehicle. The ECU includes an image processor operable to process image data captured by any of the plurality of cameras and generate video images. A video mirror display screen is disposed at an interior rearview mirror assembly of the vehicle and is operable to display video images provided by the ECU. Responsive to a triggering event, the ECU, via processing of image data captured by at least one of the driver-side and passenger-side rear corner cameras, generates cross-traffic view video images and provides the cross-traffic view video images to the video mirror display screen. The cross-traffic view video images are displayed in a split-screen format at the video mirror display screen.

18 Claims, 9 Drawing Sheets

(51) Int. Cl.
*H04N 7/18* (2006.01)
*B60R 1/02* (2006.01)
*B60R 1/12* (2006.01)

(58) Field of Classification Search
CPC ...... B60R 2300/105; B60R 2300/8066; B60R 1/12; B60R 2011/0005; B60R 1/06; B60R 1/002; B60R 2300/10; B60R 2300/101; B60R 2300/102; B60R 2300/103; B60R 2300/602; B60R 2300/605; B60R 2300/70; B60R 2300/8033; B60R 2300/804; B60R 2300/8053; B60R 2300/8073; B60R 2300/8086; B60R 2300/8093; H04N 7/181; H10K 71/135; H10K 85/631; H10K 85/615; H10K 85/141; H10K 50/16; H10K 50/18; H10K 50/171; H10K 50/15; B62D 15/027; C07C 11/21
USPC ................................... 257/40; 348/148, 837
See application file for complete search history.

(56) References Cited

U.S. PATENT DOCUMENTS

| | | | |
|---|---|---|---|
| 3,266,016 A | 8/1966 | Maru | |
| 4,499,451 A | 2/1985 | Suzuki et al. | |
| 4,588,267 A | 5/1986 | Pastore | |
| 4,623,222 A | 11/1986 | Itoh et al. | |
| 4,630,904 A | 12/1986 | Pastore | |
| 4,721,364 A | 1/1988 | Itoh et al. | |
| 4,906,085 A | 3/1990 | Sugihara et al. | |
| 5,313,335 A | 5/1994 | Gray et al. | |
| 5,355,284 A | 10/1994 | Roberts | |
| 5,436,741 A | 7/1995 | Crandall | |
| 5,481,409 A | 1/1996 | Roberts | |
| 5,550,677 A | 8/1996 | Schofield et al. | |
| 5,575,552 A | 11/1996 | Faloon et al. | |
| 5,587,699 A | 12/1996 | Faloon et al. | |
| 5,668,663 A | 9/1997 | Varaprasad et al. | |
| 5,670,935 A | 9/1997 | Schofield et al. | |
| 5,760,962 A | 6/1998 | Schofield et al. | |
| 5,786,772 A | 7/1998 | Schofield et al. | |
| 5,788,357 A | 8/1998 | Muth et al. | |
| 5,796,094 A | 8/1998 | Schofield et al. | |
| 5,938,320 A | 8/1999 | Crandall | |
| 6,005,724 A | 12/1999 | Todd | |
| 6,045,243 A | 4/2000 | Muth et al. | |
| 6,097,023 A | 8/2000 | Schofield et al. | |
| 6,111,683 A | 8/2000 | Cammenga et al. | |
| 6,257,746 B1 | 7/2001 | Todd et al. | |
| 6,264,353 B1 | 7/2001 | Caraher et al. | |
| 6,356,376 B1 | 3/2002 | Tonar et al. | |
| 6,396,397 B1 | 5/2002 | Bos et al. | |
| 6,512,624 B2 | 1/2003 | Tonar et al. | |
| 6,690,268 B2 | 2/2004 | Schofield et al. | |
| 6,700,692 B2 | 3/2004 | Tonar et al. | |
| 7,253,723 B2* | 8/2007 | Lindahl | G06F 3/0489 340/425.5 |
| 7,255,451 B2* | 8/2007 | McCabe | B60R 1/1207 359/605 |
| 7,492,281 B2 | 2/2009 | Lynam et al. | |
| 7,777,611 B2 | 8/2010 | Desai | |
| 7,965,336 B2 | 6/2011 | Bingle et al. | |
| 8,054,201 B2* | 11/2011 | Okugi | G08G 1/166 382/104 |
| 8,154,418 B2* | 4/2012 | Peterson | G06F 3/04886 348/148 |
| 8,508,831 B2* | 8/2013 | De Wind | B24B 9/08 359/267 |
| 8,730,553 B2* | 5/2014 | De Wind | B60R 1/04 359/267 |
| 9,041,806 B2 | 5/2015 | Baur et al. | |
| 9,085,261 B2 | 7/2015 | Lu et al. | |
| 9,126,525 B2 | 9/2015 | Lynam et al. | |
| 9,227,568 B1* | 1/2016 | Hubbell | G02B 5/09 |
| 9,346,403 B2* | 5/2016 | Uken | B60R 1/12 |
| 9,446,713 B2 | 9/2016 | Lu et al. | |
| 9,598,016 B2* | 3/2017 | Blank | G02B 5/0816 |
| 9,609,757 B2 | 3/2017 | Steigerwald | |
| 9,674,490 B2* | 6/2017 | Koravadi | B60R 11/04 |
| 9,762,880 B2 | 9/2017 | Pflug | |
| 9,827,913 B2* | 11/2017 | De Wind | B60R 1/12 |
| 9,900,490 B2 | 2/2018 | Ihlenburg et al. | |
| 9,900,522 B2 | 2/2018 | Lu | |
| 10,046,706 B2 | 8/2018 | Larson et al. | |
| 10,071,687 B2 | 9/2018 | Ihlenburg et al. | |
| 10,166,924 B2 | 1/2019 | Baur | |
| 10,264,219 B2 | 4/2019 | Mleczko et al. | |
| 10,300,856 B2 | 5/2019 | Baur et al. | |
| 10,421,404 B2 | 9/2019 | Larson et al. | |
| 10,442,360 B2 | 10/2019 | LaCross et al. | |
| 10,647,256 B2* | 5/2020 | Cano | H04N 23/698 |
| 10,803,307 B2* | 10/2020 | Sakamoto | B60W 30/09 |
| 11,089,239 B1* | 8/2021 | Murad | H04N 23/90 |
| 11,505,122 B1* | 11/2022 | Englander | B60R 1/00 |
| 2012/0062743 A1* | 3/2012 | Lynam | B60W 10/20 348/148 |
| 2012/0162427 A1* | 6/2012 | Lynam | B60R 11/04 348/148 |
| 2012/0236152 A1* | 9/2012 | De Wind | G01C 21/265 348/148 |
| 2013/0162829 A1* | 6/2013 | Kadowaki | H04N 7/18 348/148 |
| 2013/0250114 A1* | 9/2013 | Lu | B60R 1/00 348/148 |
| 2014/0022390 A1* | 1/2014 | Blank | B60R 1/02 348/148 |
| 2014/0085472 A1 | 3/2014 | Lu et al. | |
| 2014/0098230 A1 | 4/2014 | Baur | |
| 2014/0160276 A1 | 6/2014 | Pliefke et al. | |
| 2014/0244111 A1* | 8/2014 | Gross | B60R 21/00 701/1 |
| 2014/0285666 A1 | 9/2014 | O'Connell et al. | |
| 2015/0002670 A1 | 1/2015 | Bajpai | |
| 2015/0022664 A1 | 1/2015 | Pflug et al. | |
| 2015/0217693 A1 | 8/2015 | Pliefke et al. | |
| 2017/0050672 A1 | 2/2017 | Gieseke et al. | |
| 2017/0217372 A1 | 8/2017 | Lu et al. | |
| 2017/0232890 A1* | 8/2017 | Lewis | G06V 20/586 348/148 |
| 2017/0254873 A1 | 9/2017 | Koravadi | |
| 2017/0302889 A1* | 10/2017 | Koravadi | H04N 7/181 |
| 2017/0355312 A1 | 12/2017 | Habibi et al. | |
| 2018/0134217 A1 | 5/2018 | Peterson et al. | |
| 2018/0215382 A1 | 8/2018 | Gupta et al. | |
| 2018/0253608 A1 | 9/2018 | Diessner et al. | |
| 2018/0276838 A1 | 9/2018 | Gupta et al. | |
| 2018/0276839 A1 | 9/2018 | Diessner et al. | |
| 2018/0276908 A1* | 9/2018 | Mader | B60R 1/04 |
| 2018/0297525 A1* | 10/2018 | Raybuck, III | B60R 1/00 |
| 2019/0016264 A1 | 1/2019 | Potnis et al. | |
| 2019/0039649 A1 | 2/2019 | Gieseke et al. | |
| 2019/0042864 A1 | 2/2019 | Pliefke et al. | |
| 2019/0047475 A1 | 2/2019 | Uken et al. | |
| 2019/0064831 A1 | 2/2019 | Gali et al. | |
| 2019/0118717 A1 | 4/2019 | Blank et al. | |
| 2019/0118860 A1 | 4/2019 | Gali et al. | |
| 2019/0143895 A1 | 5/2019 | Pliefke et al. | |
| 2019/0146297 A1 | 5/2019 | Lynam et al. | |
| 2019/0202356 A1* | 7/2019 | Cano | G06T 15/20 |
| 2019/0258131 A9 | 8/2019 | Lynam et al. | |
| 2019/0297233 A1 | 9/2019 | Gali et al. | |
| 2019/0327415 A1* | 10/2019 | Prabhakar | H04N 23/63 |
| 2019/0347825 A1 | 11/2019 | Gupta et al. | |
| 2020/0017143 A1 | 1/2020 | Gali | |
| 2020/0377022 A1 | 12/2020 | LaCross et al. | |
| 2021/0094473 A1 | 4/2021 | Gali et al. | |
| 2021/0107465 A1* | 4/2021 | Hiei | G06V 20/586 |
| 2021/0155167 A1* | 5/2021 | Lynam | G08G 1/168 |
| 2021/0162926 A1 | 6/2021 | Lu | |
| 2021/0213791 A1* | 7/2021 | Ionascu | G01S 15/86 |

(56) References Cited

U.S. PATENT DOCUMENTS

| | | | |
|---|---|---|---|
| 2021/0245662 A1* | 8/2021 | Blank | H10K 71/135 |
| 2021/0291734 A1* | 9/2021 | Zafeirakis | H04N 23/69 |
| 2021/0323473 A1 | 10/2021 | Peterson et al. | |
| 2021/0400194 A1* | 12/2021 | Seo | G06V 10/96 |
| 2022/0076032 A1* | 3/2022 | Jain | G06V 20/58 |
| 2022/0153663 A1* | 5/2022 | Blank | C07C 11/21 |
| 2023/0156141 A1* | 5/2023 | Lu | H04N 23/698 |
| | | | 348/148 |

* cited by examiner

VEHICULAR FULL MIRROR DISPLAY SYSTEM WITH AUXILIARY FORWARD AND REARWARD VIEWS

CROSS REFERENCE TO RELATED APPLICATION

The present application claims the filing benefits of U.S. provisional application Ser. No. 63/198,412, filed Oct. 16, 2020, which is hereby incorporated herein by reference in its entirety.

FIELD OF THE INVENTION

The present invention relates to vehicular vision systems that display video images derived from image data captured by one or more cameras of the vehicle.

BACKGROUND OF THE INVENTION

It is known to provide a video display at the exterior rearview mirror assembly, such as described in U.S. Pat. No. 7,777,611, which is hereby incorporated herein by reference in its entirety, or to provide a video display at an interior rearview mirror assembly to display sideward and/or rearward images, such as described in U.S. Pat. No. 5,670,935, which is hereby incorporated herein by reference in its entirety. A variety of interior and exterior mirror assemblies with indicators are known in the art, such as U.S. Pat. Nos. 5,668,663; 5,355,284; 5,788,357; 6,257,746; 6,005,724; 5,481,409; 6,111,683; 6,045,243; 6,264,353; 6,512,624; 6,356,376; 2,263,382; 2,580,014; 3,266,016; 4,499,451; 4,588,267; 4,630,904; 4,623,222; 4,721,364; 4,906,085; 5,313,335; 5,587,699; 5,575,552; 5,436,741; 5,587,699; 5,938,320; 6,700,692 and 5,786,772, which are all hereby incorporated herein by reference in their entireties.

SUMMARY OF THE INVENTION

A vehicular vision system displays video images at a video display screen of an interior rearview mirror assembly for a camera monitoring system, a rear backup camera system, and a surround view vision system. The system includes an electronic control unit (ECU) that receives image data captured by the rear backup camera, surround view vision cameras (such as a front forward viewing camera, a driver-side sideward viewing camera, a passenger-side sideward viewing camera, the rear backup camera, and front and/or rear cross-traffic cameras) and the camera monitoring system cameras (such as a rearward viewing camera, a driver-side rearward viewing camera and a passenger-side rearward viewing camera), and outputs (such as via a respective coaxial cable) to the video display of the interior rearview mirror assembly. The processing of image data captured by all of the cameras (optionally including a trailer camera disposed at a trailer that is being towed by the vehicle) is performed by a data processor or image processor at the ECU, such that less processing capabilities are needed at the video display devices at the interior rearview mirror assembly. The ECU may automatically adjust the outputs to the display devices based on the driving conditions so the appropriate video images are displayed by one or more display devices for viewing by the driver of the vehicle. For example, the system may provide rear cross traffic or side views as well as rear views during a reversing maneuver (such as when the vehicle is backing out of a parking space or the like), and/or the system may provide front cross traffic or side views during a forward driving maneuver (such as when the vehicle is moving forward out of a parking space or the like). The video images are displayed at the video mirror display screen in a split-screen format with two or three or more segments, such as with a left side view displayed at a left display region of the video mirror display screen and a right side view displayed at a right display region of the video mirror display screen. The system may provide a split-screen display of cross-traffic images or of tire view images or the like. A central region of the video mirror display screen may display images derived from image data captured by a forward or rearward viewing CMS or surround view camera.

These and other objects, advantages, purposes and features of the present invention will become apparent upon review of the following specification in conjunction with the drawings.

DESCRIPTION OF THE PREFERRED EMBODIMENTS

A vehicle vision system and/or driver or driving assist system and/or object detection system and/or alert system operates to capture images exterior of the vehicle and may process the captured image data to display images and to detect objects at or near the vehicle and in or near or approaching the predicted path of the vehicle, such as to assist a driver of the vehicle in maneuvering the vehicle in a rearward direction. The vision system includes an image processor or image processing system that is operable to receive image data from one or more cameras and to provide an output to one or more display devices for displaying video images representative of the captured image data. For example, the vision system may provide a rearview display or a top down or bird's eye or surround view display or the like.

Figure 1:
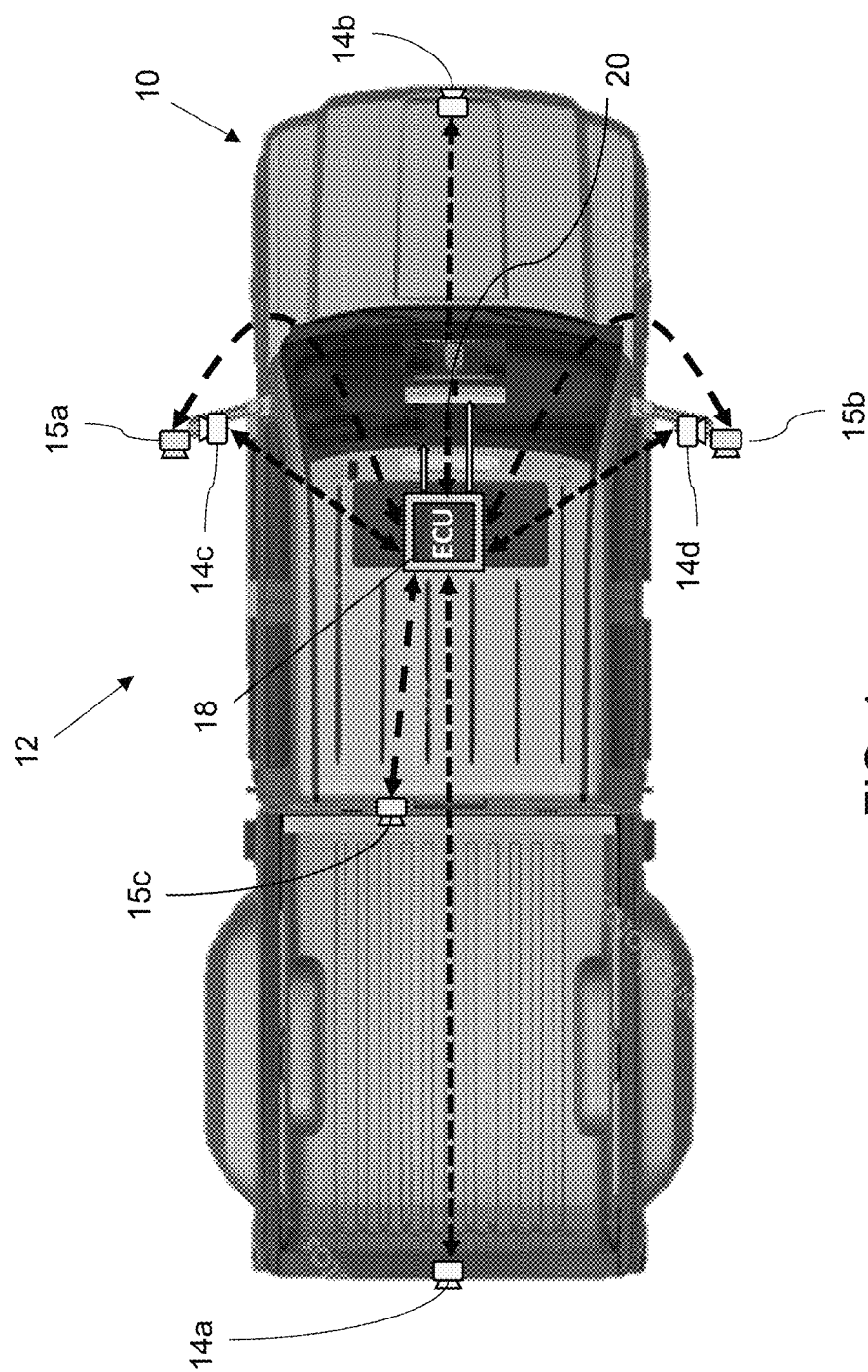
FIG. 1 is a plan view of a vehicle having a vision system.

Referring now to the drawings and the illustrative embodiments depicted therein, a vehicle 10 includes an imaging system or vision system 12 that includes multiple exterior viewing cameras, including, for example, surround view cameras 14*a*-*d* (including a rearward viewing or rear backup camera 14*a*, a forward viewing camera 14*b* at the front of the vehicle and side surround view cameras 14*c*, 14*d* at respective sides of the vehicle), camera monitoring system (CMS) cameras 15*a*-*c* (including side rearward viewing CMS cameras 15*a*, 15*b* at the respective sides of the vehicle, and a rearward viewing camera 15*c* that has a different field of view than the rear backup camera 14*a*), which capture image data of the respective scenes exterior of the vehicle and in the field of view of the respective camera, with each camera having a lens for focusing images at or onto an imaging array or imaging plane or imager of the camera (FIG. 1). Optionally, a forward viewing camera 16 (FIG. 3) may be disposed at the windshield of the vehicle and view through the windshield and forward of the vehicle, such as for a machine vision system (such as for traffic sign recognition, headlamp control, pedestrian detection, collision avoidance, lane marker detection and/or the like). Optionally, one or more rear cross-traffic cameras 15*d* may be disposed at the rear of the vehicle and configured to have a field of view that monitors for other vehicles approaching the sides of the equipped vehicle at a region near the rear of the equipped vehicle (and similarly one or more front cross-traffic cameras 15*e*, such as shown in FIG. 4, may be disposed at the front of the vehicle and have a field of view forward and sideward of the vehicle). For example a left viewing cross-traffic camera and a right viewing cross-traffic camera may be disposed at the front and/or rear of the vehicle or a wide angle camera having a field of view capable of monitoring cross traffic from both the left and right sides of the equipped vehicle may be disposed at the front and rear of the vehicle. The system may utilize aspects of the systems described in U.S. Pat. Nos. 10,442,360; 10,421,404; 10,166,924 and/or 10,046,706, and/or U.S. Publication Nos. US-2021-0245662; US-2019-0258131; US-2019-0047475; US-2019-0118717 and/or US-2017-0355312, which are all hereby incorporated herein by reference in their entireties.

As will be discussed further below, the respective cameras disposed at the vehicle, such as for the surround view cameras 14, CMS cameras 15, and forward viewing camera 16, may be mounted at the vehicle at any suitable locations. For example, the cameras may be mounted or attached in locations such as in, on or thru a rear light or a forward light of the vehicle, such as the tail lights, the headlights, the marker lamps, the turn signal indicators, the fog or driving lights, and/or the center high mounted stop lamp (CHMSL). The cameras may be mounted at the front grille or front fascia, the license plate applique (such as for the backup camera), the trunk bezel, the spoiler, the window trim, the shark fin, the antennae housing, the vehicle emblems or logos (either fixed or dynamic), the front bumper, and/or the rear bumper.

The vision system 12 includes a control or electronic control unit (ECU) 18 having electronic circuitry and associated software, with the electronic circuitry including a data processor or image processor that is operable to process image data captured by the cameras, whereby the ECU may detect or determine presence of objects or the like and/or the system may provide video images to a display device of the interior rearview mirror assembly 20 of the vehicle for viewing by the driver of the vehicle (and optionally to a video display screen at the center console or stack of the vehicle, and optionally to CMS side video display screens at or near the driver and passenger side A-pillars of the vehicle, such as described in U.S. Publication Nos. US-2018-0134217 and/or US-2014-0285666, which are hereby incorporated herein by reference in their entireties). The ECU may also include a recording function, such that the image data input from the cameras can be stored for a time to enable to the driver to retrieve the image data and view video images derived from the stored image data at a later time. The data transfer or signal communication from the cameras to the ECU may comprise any suitable data or communication link, such as a vehicle network bus or CAN (Controller Area Network) bus or LIN (Local Interconnect Network) bus or I2C bus or the like of the equipped vehicle. The ECU may be disposed at or in wired communication with the video display screen, such as disposed at or within the interior rearview mirror assembly, or the ECU may be remote from the video display screen and communicate with the video display screen wirelessly. For example, the ECU may be remote from the video display screen at a location within the vehicle (such as under the seats or at the instrument panel and/or at a central ECU of the vehicle) or at a location remote from the vehicle and wirelessly communicating with the vehicle and/or video display screen over a wireless network. The CMS cameras and system may utilize aspects of the systems described in U.S. Pat. Nos. 10,442,360 and/or 10,046,706, and/or U.S. Publication Nos. US-2021-0245662; US-2021-0162926; US-2021-0155167; US-2019-0118717; US-2018-0134217 and/or US-2014-0285666, and/or U.S. provisional applications, Ser. No. 63/260,936, filed Sep. 7, 2021, Ser. No. 63/201,405, filed Apr. 28, 2021, Ser. No. 63/199,858, filed Jan. 29, 2021, and/or Ser. No. 63/199,526, filed Jan. 6, 2021, which are all hereby incorporated herein by reference in their entireties.

The video display screen is operable to display video images captured by one or more of the cameras. For example, the video display screen may provide a single video image display, such as for displaying video images derived from image data captured by the rearward viewing camera co-located at the CHMSL area or by the rear backup camera or by the rearward viewing trailer-mounted camera. The video display screen may operate to provide a split screen display, where the video display screen is split into two or three or more sections or regions or segments to display desired images, or multiple camera inputs may be stitched together to provide a single display image. The video display screen may be operable to provide the split screen display to display images from multiple camera inputs at a given time, such as for displaying video images derived from image data captured by the two side-mounted rearward and sideward viewing cameras (such as for a CMS system), and/or the video display screen may operate to provide the split screen display for displaying video images derived from image data captured by the two side-mounted rearward and sideward viewing cameras with a central pane of video images derived from image data captured by the rearward viewing camera at the CHMSL area or the rearward viewing trailer-mounted camera (such as for a CMS system). Thus, the video display screen may be configured in a split screen or a stitched multi image display, such as to provide the driver with a more understandable, intuitive displayed image (e.g., to provide a field of view that could be up to or greater than around 180 degrees). The system may be configured to adjust the video images displayed at the display screen or switch between different views, such as responsive to a user input or a determined condition of the vehicle, such as based on a driving maneuver performed by the vehicle (such as based on an unparking maneuver or a parking maneuver), determination (via image processing of captured image data) of a detected pedestrian or object in a field of view of a camera, selection at a gear selector of the vehicle, determination of a position of the vehicle (such as via image processing of captured image data or such as responsive to a global positioning system (GPS) of the vehicle or in communication with a system of the vehicle), or determination that the vehicle is travelling below a threshold speed. The system may be configured to provide video images at the video display screen where the displayed images may contain graphical overlays, icons or images such as to aid in driver perception of the displayed images.

Figure 2:
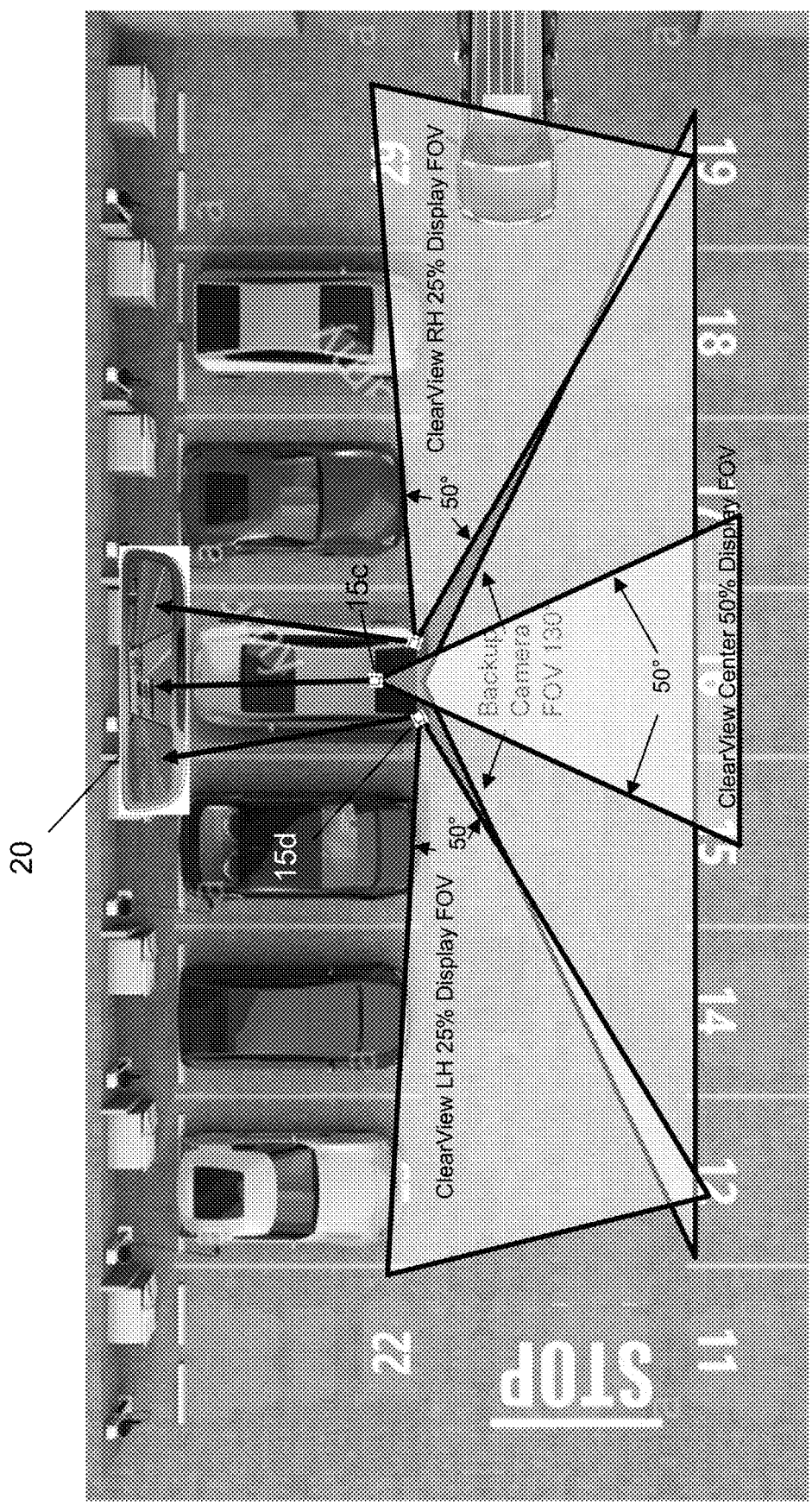
FIG. 2 is a plan view of the equipped vehicle at a parking space, showing the different views provided by the rearward and sideward viewing cameras at the vehicle.

For example, and such as shown in FIG. 2, the system may provide a cross-traffic watch mode, where the display screen displays a central image based on an output of the rear center-mounted camera 15c and side images based on outputs of two rear-mounted sideward and rearward viewing cameras 15d. Thus, the driver of the vehicle, when, for example, reversing the vehicle out of a parking space, can see behind the vehicle and sideward of the vehicle. The displayed video images are provided in a split screen format so the driver can readily discern between the different views of the displayed images. The cameras 15d may be mounted at the rear corners of the vehicle, such as in the tail lamps of the vehicle, and are aimed to provide a view of cross traffic. For example, a driver-side rear corner camera may be mounted in or through or at a rear light of the vehicle, such as a taillight or tail lamp or turn signal indicator at the driver-side of the vehicle, and a passenger-side rear corner camera may be mounted in or through or at a rear light of the vehicle, such as a taillight or tail lamp or turn signal indicator at the passenger-side of the vehicle. The images are displayed at the mirror display, providing a view of cross traffic when it is not visible to the driver, such as when backing out of a space in a parking lot.

Figure 3:
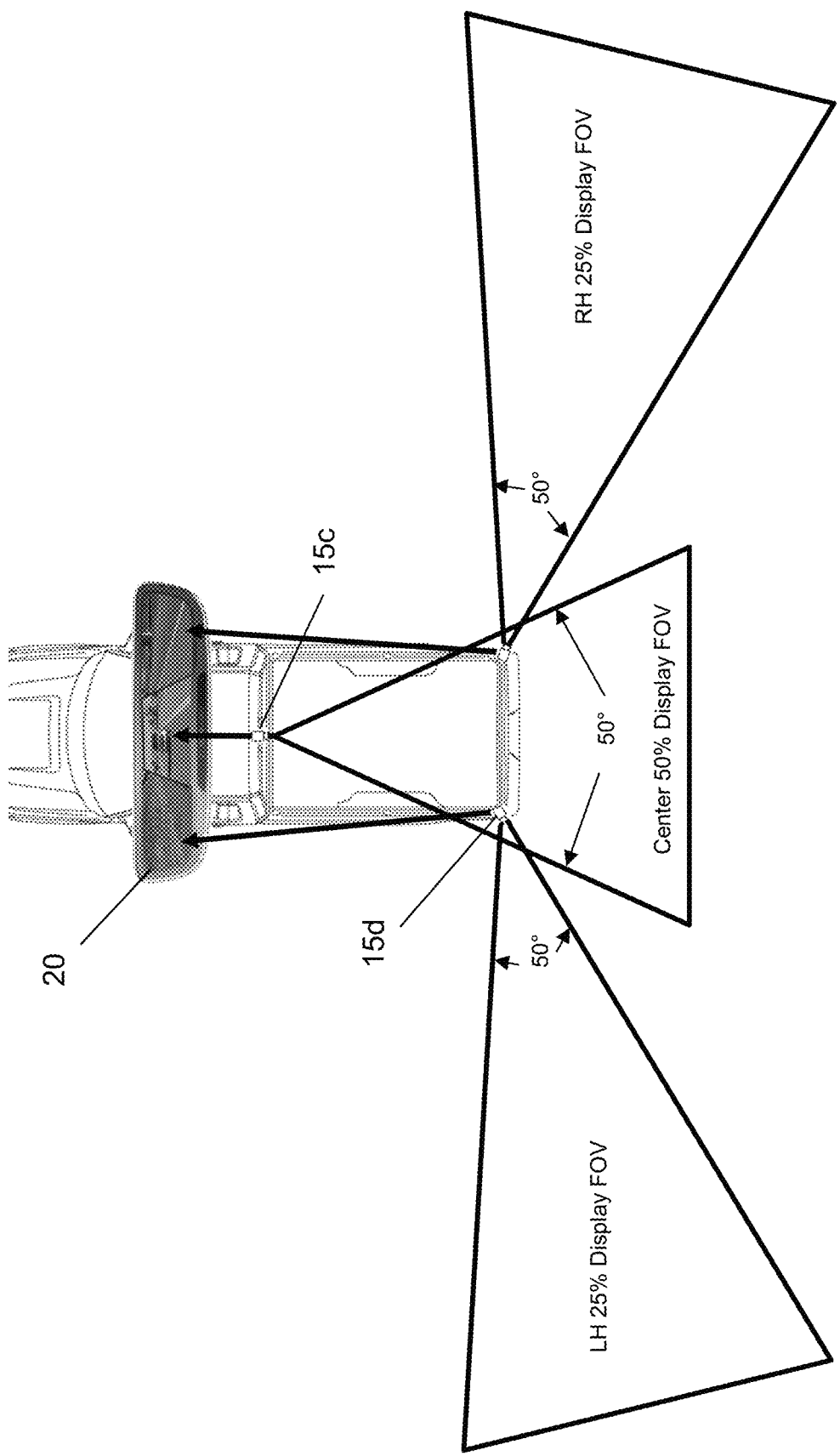
FIG. 3 is a plan view of the vehicle, showing a split screen display of images captured by a rearward viewing camera and two rear-mounted sideward and rearward viewing cameras.
Figure 4:
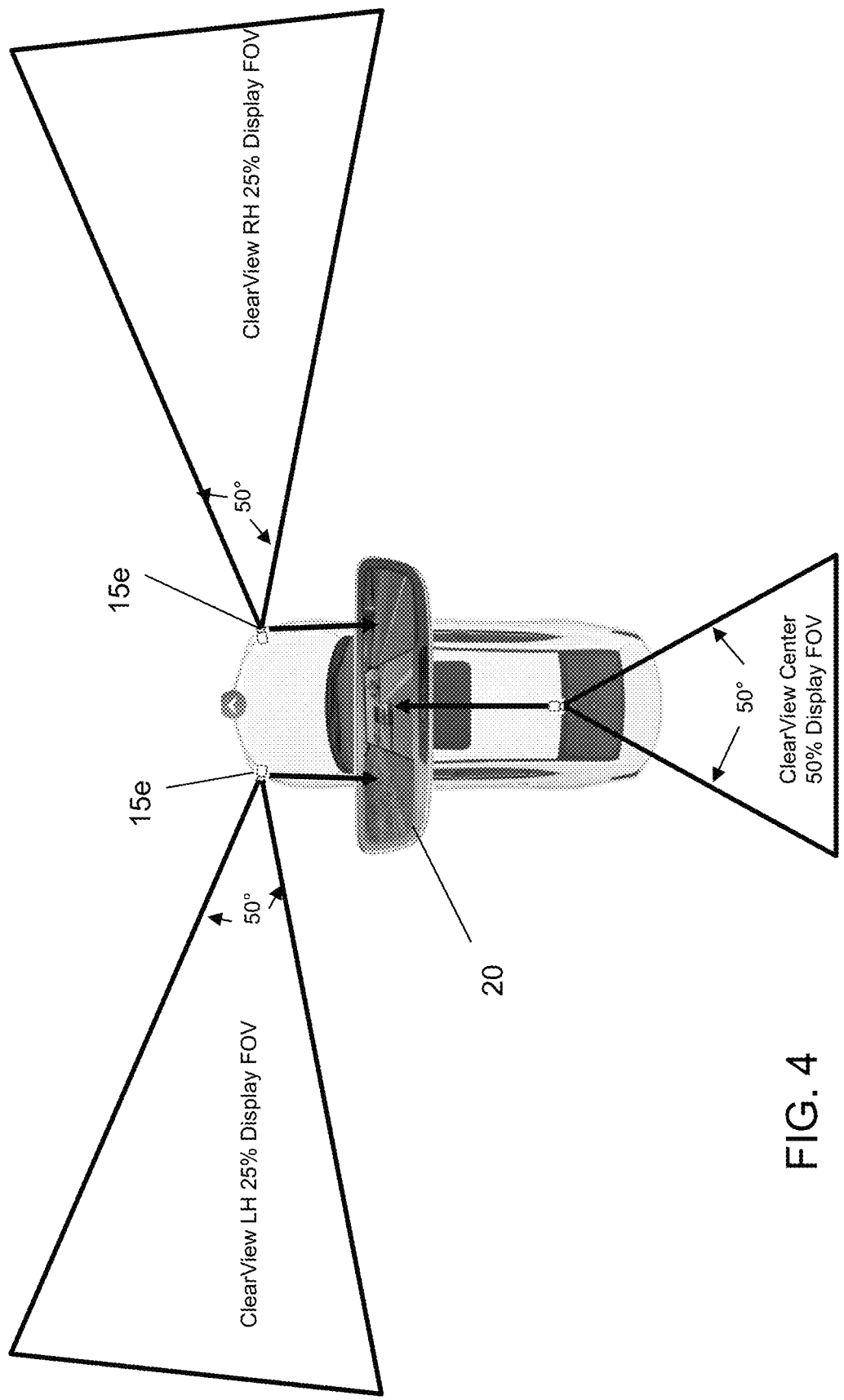
FIG. 4 is a plan view of the vehicle and system, showing a split screen display of images captured by two front-mounted sideward and forward viewing cameras.

As can be seen in FIGS. 2 and 3, the cross-traffic split screen display mode provides a wider view that what is provided by the rear backup camera 14a, and thus provides enhanced viewing to the driver of the vehicle during such a driving maneuver. The system may automatically switch to the cross traffic mode, such as responsive to determination that the vehicle is in a parking space and is reversing out of the space (with such determination being made via processing of image data captured by one or more of the vehicle cameras) or responsive to determination that traffic or pedestrians or objects are present in the field of view of one of the cameras 15d, or the system may switch to the cross traffic display mode responsive to actuation of a user input by the driver of the vehicle. The system may display cross-traffic video images from both sides at a given time or only from one side, such as if one side image is not required (e.g., traffic is only approaching from one direction). The system may then alert the driver, such as via an audible alert (for example, an audible tone or beep), a haptic alert (for example, a vibration in the driver's seat), or a visual alert (for example, the border of the cross traffic view could be highlighted with a color and/or flashing when activated).

Similarly, the system may also provide a forward cross traffic display mode (FIG. 4). The system may include front-mounted cameras 15e that capture images sideward and forward of the vehicle. For example, the cameras may be mounted at the front corners of the vehicle, such as at the head lamps, and aimed to provide a view of cross traffic in front of the vehicle. For example, a driver-side front corner camera may be mounted in or through or at a forward light of the vehicle, such as a headlight or fog lamp or daytime running light or turn signal indicator at the driver-side of the vehicle and a passenger-side front corner camera may be mounted in or through or at a forward light of the vehicle, such as a headlight or fog lamp or daytime running light or turn signal indicator at the passenger-side of the vehicle. The video images are displayed on the mirror display, providing a view of cross traffic when it is not visible to the driver, such as when entering an intersection or roadway with limited visibility of cross traffic. The video display may display two images based on the two cameras 15e (in split-screen format), or may include a central image (between the two side display regions) derived from image data captured by the front viewing surround view camera 14b or by the windshield mounted camera.

Figure 5:
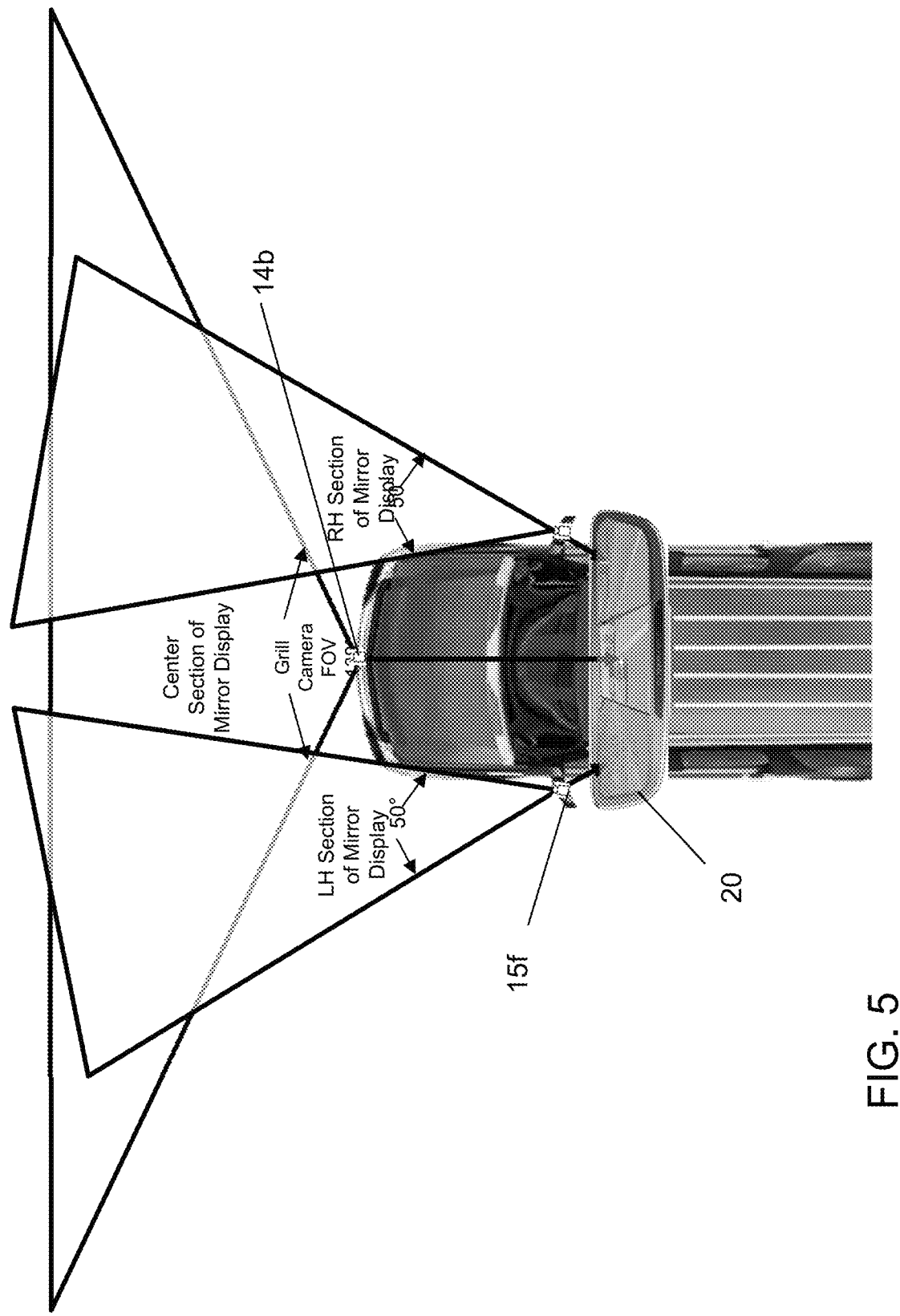
FIG. 5 is a plan view of the vehicle, showing a split screen display of images captured by a forward viewing camera and two exterior mirror-mounted sideward and forward viewing cameras.
Figure 6:
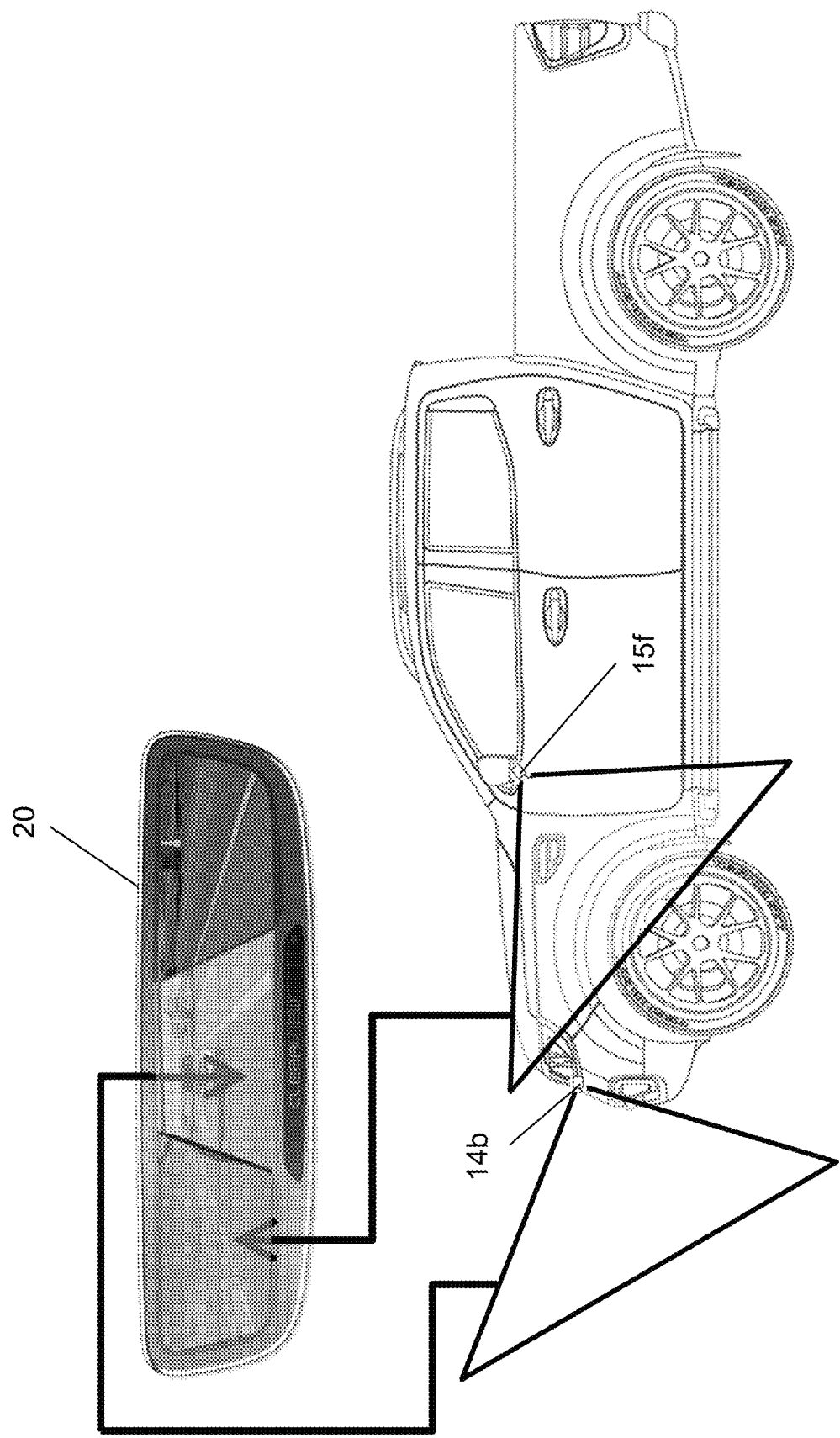
FIG. 6 is a side view of the vehicle and system of FIG. 5.

Optionally, the system may provide a split screen display for showing the front wheels of the vehicle and/or for providing a "see-through-hood" display mode. As shown in FIGS. 5 and 6, the system may include mirror mounted forward and sideward viewing cameras 15f that are directed in a downward and forward direction along the respective side of the vehicle so as to include the respective wheel and tire in the field of view. The video display may (when the wheel view or see-through-hood view is selected) display images of the wheels/tires and images of the area immediately forward of the vehicle (based on an output of the forward viewing surround view camera 14b) so that the driver of the vehicle can see the front tires and can see the area immediately ahead of the vehicle and at the front sides of the vehicle (so as to effectively see through the hood and engine compartment of the vehicle).

Figure 7:
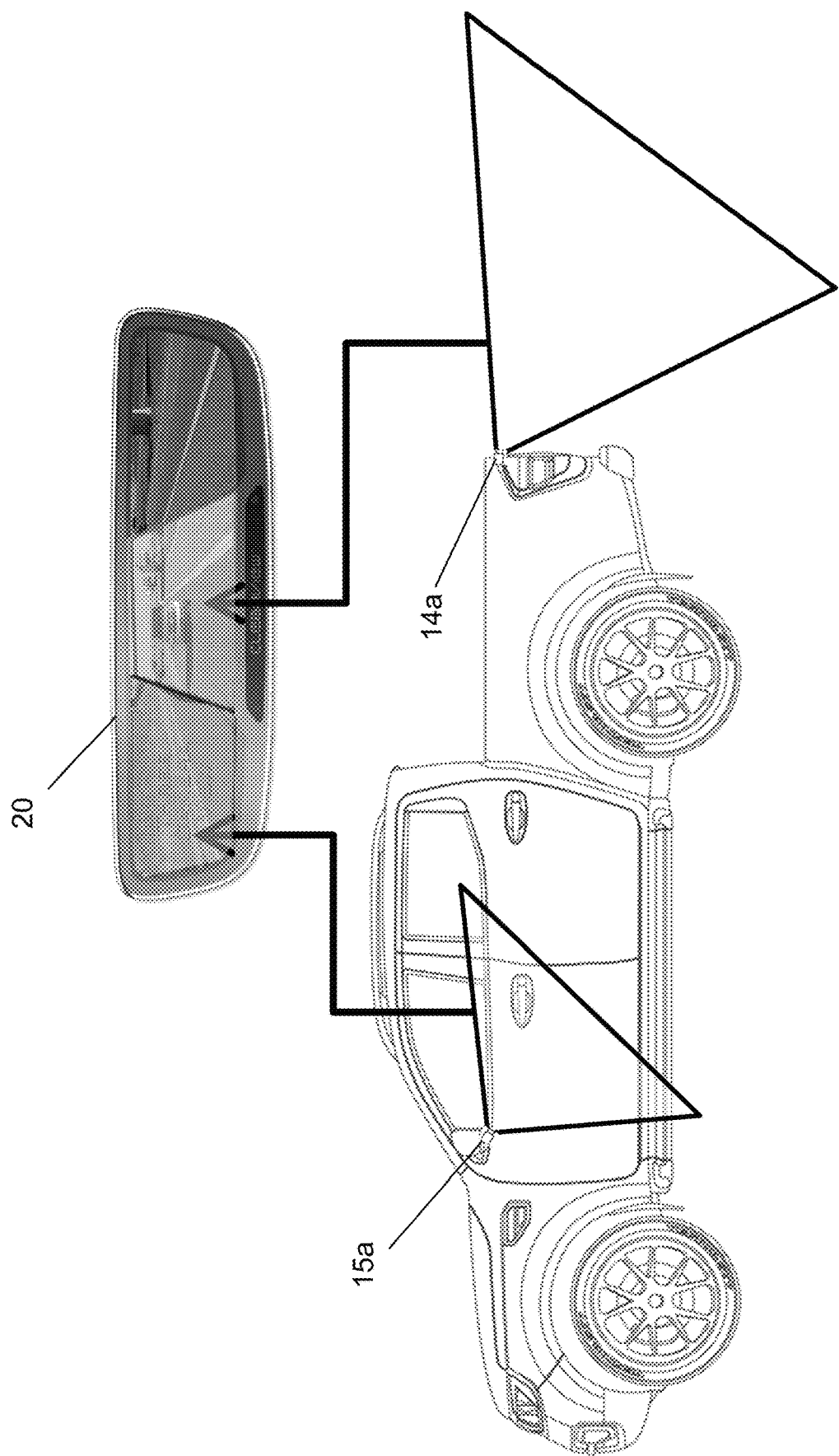
FIG. 7 is another side view of the vehicle and system, showing a split screen display of images captured by a rearward viewing or rear backup camera and two exterior mirror-mounted sideward and rearward viewing cameras.

Similarly, the system may provide a split screen display for showing the rear wheels of the vehicle. As shown in FIG. 7, the system may include the mirror mounted rearward and sideward viewing camera 15a (or separate, more downwardly directed cameras than the side/rear viewing cameras 15a, 15b) that are directed in a downward and rearward direction along the respective side of the vehicle so as to include the respective wheel and tire in the field of view. The video display may (when the wheel view mode is selected) display images of the rear wheels/tires and images of the area immediately rearward of the vehicle (based on an output of the rear backup camera 14a) so that the driver of the vehicle can see the rear tires and can see the area immediately rearward of the vehicle and at the rear sides of the vehicle, which may assist the driver during a reversing or parking maneuver of the vehicle.

Although shown in FIGS. 3-6 as the interior rearview mirror assembly 20 providing the video display screen displaying the split-screen display, the exterior side view mirrors of the vehicle may optionally comprise respective video display screens, such as disposed behind or integrated into the respective mirror reflective elements, and may display selected video images to the driver of the vehicle. Thus, the system may provide a split screen display for providing multiple views to the driver of the vehicle where all displayed views are provided at the interior rearview mirror assembly, or one or more views may be provided at the exterior side view mirror assembly. For example, a rear and sideward view may be displayed next to a rearward view at the interior rearview mirror assembly or the rear and sideward view may be displayed at the side view mirror corresponding to the respective side of the view. Optionally, such rear and sideward views may be displayed at interior side display screens disposed at or near the respective A-pillar of the vehicle and viewable by the driver of the vehicle.

Figure 8:
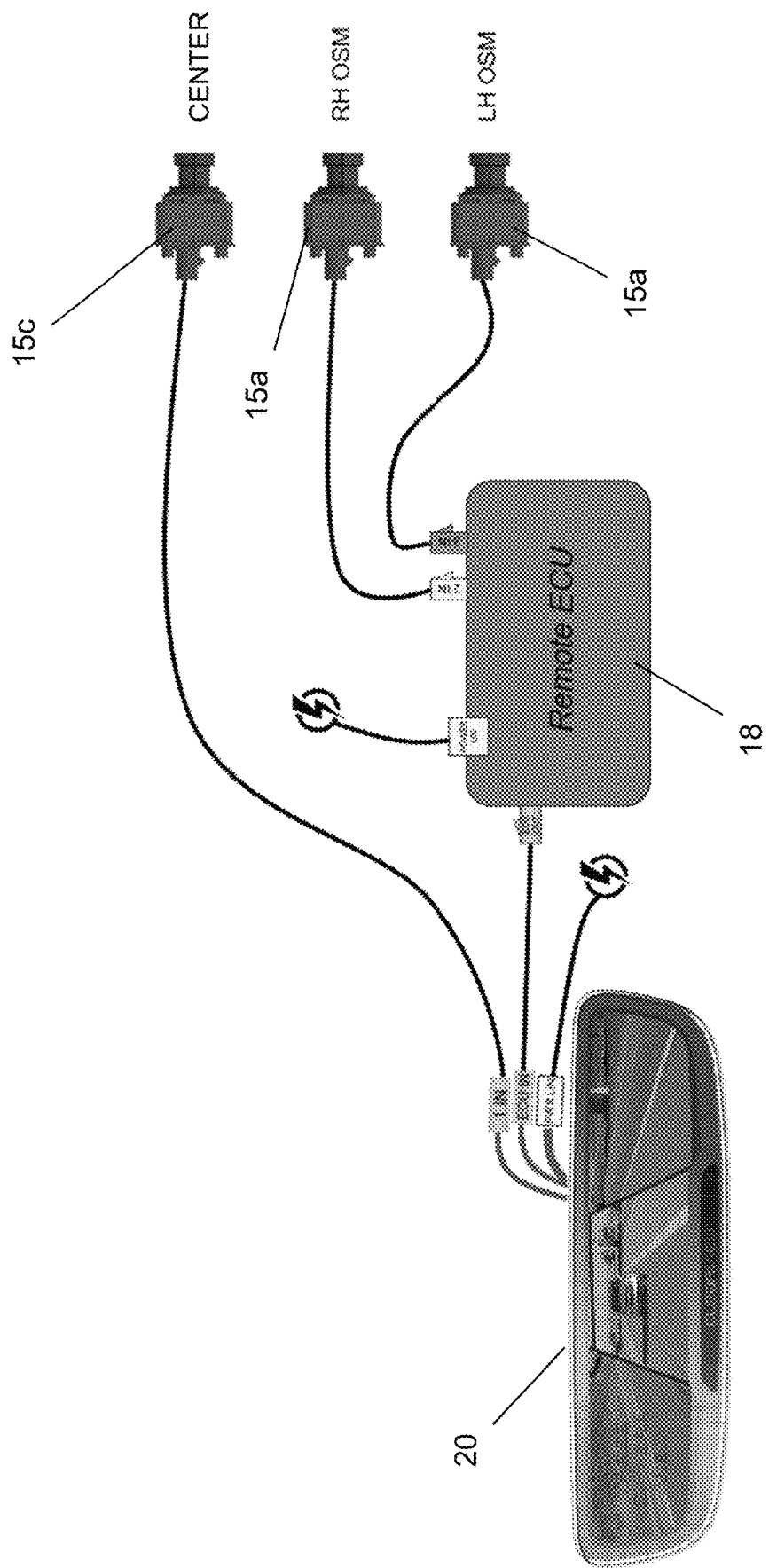
FIG. 8 is a diagram showing connection of the cameras to the ECU and/or the video display screen at the interior rearview mirror assembly.
Figure 9:
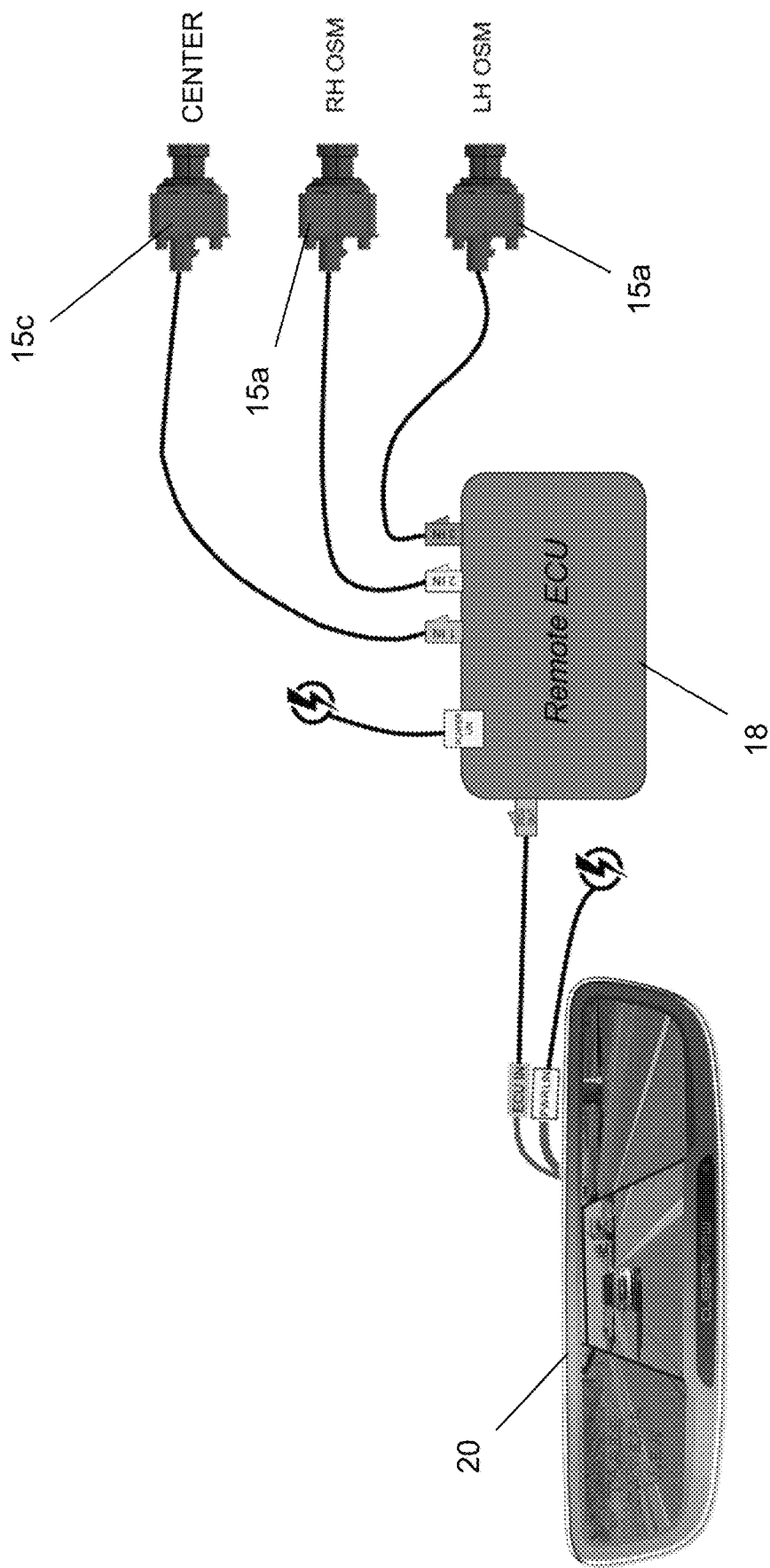
FIG. 9 is another diagram showing connection of the cameras to the ECU, which connects to the video display screen at the interior rearview mirror assembly.

As shown in FIG. 8, the side cameras may be electrically connected to and may communicate with the ECU, while the rear CHMSL camera may be electrically connected to and may communicate with the video display screen at the interior rearview mirror assembly. Optionally, and such as shown in FIG. 9, the ECU receives image data captured by each of the cameras and the image data is processed by the data processor or image processor of the ECU. The ECU is connected to the video display of the mirror assembly 20, such as via a single coaxial wire or cable for communicating with the display (such as to provide control signals or the like) and for providing video image signals to the display. Thus, the ECU can provide video images to the video mirror display 20.

The system may provide a standard or default view (such as displaying video images derived from only the rear backup camera) and change or adjust the display to provide a different view or split screen display automatically, such as responsive to determination at the ECU of a condition at the vehicle. The ECU or system, for example, may determine that the vehicle is performing a driving maneuver, such as an unparking maneuver to pull out of a parking spot, based on processing of the image data and/or processing of sensor data or signals received from other sensors or systems at the vehicle (e.g., radar, lidar, GPS, gear selector). For example, the system may determine that the vehicle is pulling forward out of a parking space (such as based on a gear selection of a drive gear and a determination that the vehicle is located in a parking space) and provide the forward cross traffic display mode. The system may provide the display based on one or more conditions at the vehicle, such as based on the parking maneuver performed and determination of presence of traffic, objects or pedestrians, the vehicle traveling below a threshold speed (e.g., cross-traffic or split screen video images of an unparking maneuver may only be displayed when the vehicle is traveling at a speed below a threshold speed of, for example, 5 mph or 10 mph), determination of a location of the vehicle, and/or responsive to a user input.

The system may also adjust the display to display video images from only one side or direction of the vehicle. For example, the system may determine presence of traffic or pedestrians or objects approaching from one direction of the vehicle during a driving maneuver and display the cross-traffic video images from that direction. The system may display the cross-traffic video images from that direction in split screen with rearview or forward view video images. Upon determining presence of additional traffic or pedestrians or objects approaching from the other direction, the system may adjust the display to display the cross-traffic video images from the other direction, such as in split screen with the other cross-traffic video images and/or the rearview or forward view video images.

Thus the system provides surround view cameras 14, CMS cameras 15, and/or a forward viewing camera 16 that each capture image data representing respective fields of view exterior the vehicle and transmit the respective captured image data to the ECU. The ECU processes the captured image data and transmits the processed captured image data to a video display screen for displaying video images that are viewable by a driver of the vehicle. The video display screen may display split-screen video images or stitched video images, such as to provide rear and/or forward cross-traffic display modes or for showing the front and/or rear wheels or for providing a "see-through-hood" display mode. The system may provide the views, such as responsive to a user actuated input, or automatically, such as based on a condition of the driver or condition of the vehicle. For example, the system may process the captured image data to determine whether to provide a view or receive inputs or may process captured sensor data from one or more sensors or systems of the vehicle, such as a radar (such as part of a blind spot monitoring or rear cross traffic alert system of the vehicle), ultrasonic sensors, P-R-N-D-L signal (from a gear selector of the vehicle), a driver monitoring camera system, a vehicle speed input, a GPS location input, a usage database (such as a data set and algorithm (neural net) to identify situations for use, for example, learning driver habits and tendencies to predict usage patterns for drivers). The system may receive the sensor inputs or sensor data via any suitable data or communication link, such as the vehicle network bus or CAN (Controller Area Network) bus or LIN (Local Interconnect Network) bus or I2C bus or the like of the equipped vehicle.

The connections between the cameras and the ECU and/or between the display and the ECU may be made via respective coaxial cables, which may provide power and control of the cameras (by the ECU) and which may provide image data from the cameras to the ECU, and which may provide video images from the ECU to the display device. Each device (e.g., camera and display device) is thus connected to and communicates with the ECU via a single respective coaxial cable, thus reducing cable inputs to the video mirror display. The connections and communications may utilize aspects of the systems described in U.S. Pat. Nos. 10,264, 219; 9,900,490 and/or 9,609,757, which are hereby incorporated herein by reference in their entireties.

The rearward viewing camera 15c of the CMS cameras may also or otherwise function to provide rearward video images for a dual-mode interior rearview video mirror that can switch from a traditional reflection mode to a panoramic live-video display mode, such as is by utilizing aspects of the mirror assemblies and systems described in U.S. Pat. Nos. 10,442,360; 10,421,404; 10,166,924 and/or 10,046, 706, and/or U.S. Publication Nos. US-2021-0245662; US-2021-0162926; US-2021-0155167; US-2020-0377022; US-2019-0258131; US-2019-0146297; US-2019-0118717; US-2019-0047475 and/or US-2017-0355312, and/or U.S. patent applications, Ser. No. 17/301,853, filed Apr. 16, 2021, which are all hereby incorporated herein by reference in their entireties.

The interior rearview mirror assembly (and optionally the exterior side view mirror assemblies or center console) may comprise any suitable mirror assembly having a video display device disposed behind the mirror reflective element so as to be viewable through a partially reflectant and partially visible light transmitting or transflective mirror reflector of the mirror reflective element when the display screen is powered. For example, the interior rearview mirror assembly may comprise an auto-dimming electro-optic (such as electrochromic) mirror assembly that operates as a reflecting mirror when the display screen is off, and functions as a video mirror when the display screen is activated. Optionally, the mirror assembly may comprise a prismatic mirror reflective element (that is toggled between a daytime viewing position and a nighttime or anti-glare viewing position) having a video display screen disposed behind the transflective mirror reflector of the prismatic mirror reflective element.

Thus, when the mirror assembly is set to the video display mode (such as via actuation by the driver of a user-actuatable input), the ECU automatically switches to communicate video images derived from image data captured by the rearward viewing camera 15c to the video display screen at the interior rearview mirror.

Optionally, when a trailer is hitched to the vehicle, the system may include or communicate with one or more trailer cameras (such as sideward viewing cameras and a forward viewing camera) to provide a surround view display of areas around the trailer as well as the vehicle, such as by utilizing aspects of the systems described in U.S. Publication No. US-2021-0094473, which is hereby incorporated herein by reference in its entirety. Optionally, the system may provide for display of a trailer see-through image (such as by utilizing aspects of the systems described in U.S. Publication No. US-2021-0094473, incorporated above), which shows a rearward and transparent view through the trailer with seamlessly stitching of video images and image data captured by the towing vehicle's rear backup camera with video images and image data captured by the trailer or satellite camera to provide the rearward video images. The ECU may communicate with the trailer camera via a wired connection, wirelessly, or through a wireless hub at the trailer, where the trailer camera transmits captured image data to the wireless hub (via a wired connection or wirelessly) at the trailer and the wireless hub at the trailer wirelessly transmits the captured image data to the ECU.

The trailer assist system or trailer surround view display system may utilize aspects of the systems described in U.S. Pat. Nos. 9,446,713; 9,085,261 and/or 6,690,268, and/or U.S. Publication Nos. US-2020-0017143; US-2019-0297233; US-2019-0347825; US-2019-0118860; US-2019-0064831; US-2019-0042864; US-2019-0039649; US-2019-0143895; US-2019-0016264; US-2018-0276839; US-2018-0276838; US-2018-0253608; US-2018-0215382; US-2017-0254873; US-2017-0217372; US-2017-0050672; US-2015-0217693; US-2014-0160276; US-2014-0085472 and/or US-2015-0002670, which are all hereby incorporated herein by reference in their entireties.

Optionally, the ECU may provide video images responsive to other vehicle systems, such as responsive to a lane-change assist system or blind zone monitoring system or the like. For example, the ECU may provide video images to the video screen of the interior video mirror responsive to vehicle approach in a side lane only when a lane change maneuver of the equipped vehicle is anticipated (such as by the driver activating a turn signal indicator or such as by a camera vision-based lane departure warning system of the equipped vehicle detecting a lane change maneuver). In this regard, use can be made of the systems described in U.S. Pat. No. 10,300,856, which is hereby incorporated herein by reference in its entirety.

Optionally, the system may provide for dimming control of the electrochromic mirror reflective element of the interior mirror and of the electrochromic mirror reflective elements of the exterior mirrors via processing of image data captured by one or more of the cameras (such as by utilizing aspects of the vision systems described in U.S. Publication Nos. US-2019-0258131 and/or US-2019-0047475, which are hereby incorporated herein by reference in their entireties).

Optionally, the vehicle may be equipped with a blind zone detector (such as a radar sensor or the like that senses the region sideward of the vehicle that is not readily viewed by the driver of the vehicle). When another vehicle or object appears in the blind zone, the blind zone indicator (typically an icon or indicator at the exterior rearview mirror at that side of the vehicle) is actuated to alert the driver of the detected other vehicle at that side of the vehicle. The detection system outputs an electrical signal that is provided to the indicator and may also provide an electrical signal to the interior mirror display, such that, simultaneous with the indicator at the exterior mirror being actuated, the video display at the interior mirror is also actuated to provide an alert to the driver at the interior mirror as well. For example, detection of a vehicle in the blind zone at a particular side of the vehicle may result in video images (derived from image data captured by the side camera at that side of the vehicle) being displayed at the interior mirror (such as at a respective side region of the interior mirror) and/or may result in an icon or indicia (indicative of a detection, such as an icon similar to the icon of the blind zone indicator at the exterior mirror) appearing at interior mirror (such as at a respective side region of the interior mirror). Optionally, the indication at the interior mirror may be user selected (such as via a user actuatable input or switch or such as via a menu selection from a touch screen of the vehicle or the like) to provide the desired image and/or icon at the interior mirror and/or to provide no display or icon at the interior mirror, depending on the preferences of the driver of the vehicle. The blind zone indicating system may utilize aspects of the systems described in U.S. Pat. Nos. 9,041,806; 7,492,281 and/or 5,786,772, and/or U.S. Publication Nos. US-2018-0134217 and/or US-2014-0098230, which are hereby incorporated herein by reference in their entireties.

The cameras may comprise any suitable imaging sensor or camera, such as a pixelated imaging array or the like, such as a CMOS imaging array sensor, a CCD sensor or other sensors or the like, such as a camera or sensor of the types disclosed in commonly assigned, U.S. Pat. Nos. 7,965,336; 5,550,677; 5,760,962; 6,097,023 and 5,796,094, which are hereby incorporated herein by reference in their entireties. Optionally, the cameras may comprise a stereo imaging camera or the like, such as by utilizing aspects of the imaging systems described in U.S. Pat. Nos. 6,396,397 and/or 5,796,094, which are hereby incorporated herein by reference in their entireties. Optionally, the cameras may comprise an infrared or near infrared light sensitive camera and may be suitable for capturing images in low lighting conditions, and/or the camera may include or be associated with an illumination source (such as an infrared or near-infrared light emitting illumination source that, when actuated to emit infrared or near-infrared light at the side of the vehicle, enhances the camera's performance but is not visible or discernible to the driver of the vehicle), such as by utilizing aspects of the cameras described in U.S. Pat. Nos. 7,965,336; 5,550,677; 5,760,962; 6,097,023 and 5,796,094, which are hereby incorporated herein by reference in their entireties.

The sideward and rearward viewing cameras may be incorporated at the exterior rearview mirror assembly or elsewhere at the vehicle, such as at a side portion of the vehicle, and having a sideward and rearward field of view. Optionally, the camera may have a wide angle field of view at the side of the vehicle and/or may have an adjustable field of view and/or may capture images for use in other vision systems, such as for use in a top-down view or bird's-eye view vision system of the vehicle or a surround view vision system at the vehicle, such as by utilizing aspects of the vision systems described in U.S. Pat. Nos. 9,126,525; 9,041, 806; 9,900,522; 9,900,522; 10,071,687 and/or 9,762,880, and/or U.S. Publication Nos. US-2015-0022664 and/or US-2012-0162427, which are hereby incorporated herein by reference in their entireties.

The mirror assembly may comprise any suitable construction, such as, for example, a mirror assembly with the reflective element being nested in the mirror casing and with a bezel portion that circumscribes a perimeter region of the front surface of the reflective element, or with the mirror casing having a curved or beveled perimeter edge around the reflective element and with no overlap onto the front surface of the reflective element (such as by utilizing aspects of the mirror assemblies described in U.S. Pat. Nos. 7,184,190; 7,274,501; 7,255,451; 7,289,037; 7,360,932; 7,626,749; 8,049,640; 8,277,059 and/or 8,529,108, which are hereby incorporated herein by reference in their entireties) or such as a mirror assembly having a rear substrate of an electro-optic or electrochromic reflective element nested in the mirror casing, and with the front substrate having curved or beveled perimeter edges, or such as a mirror assembly having a prismatic reflective element that is disposed at an outer perimeter edge of the mirror casing and with the prismatic substrate having curved or beveled perimeter edges, such as described in U.S. Pat. Nos. 8,508,831; 8,730,553; 9,598,016 and/or 9,346,403, and/or U.S. Publication Nos. US-2014-0313563 and/or US-2015-0097955, which are hereby incorporated herein by reference in their entireties (and with electrochromic and prismatic mirrors of such construction are commercially available from the assignee of this application under the trade name INFINITY™ mirror).

The mirror assembly may include user inputs or actuatable switches or touch sensors or the like for user/driver control of one or more features of the mirror assembly and/or display system. The user inputs or touch sensors may comprise any suitable sensors or inputs, and may utilize aspects of the inputs and sensors described in U.S. Pat. Nos. 9,827,913; 9,598,016; 9,346,403; 8,508,831; 8,730,553; 7,224,324; 7,253,723; 7,255,451 and/or 8,154,418, which are hereby incorporated herein by reference in their entireties.

Optionally, the display may utilize aspects of the displays of the types disclosed in U.S. Pat. Nos. 9,264,672; 9,041,806; 7,855,755; 7,777,611; 7,626,749; 7,581,859; 7,446,924; 7,446,650; 7,370,983; 7,338,177; 7,274,501; 7,255,451; 7,195,381; 7,184,190; 6,690,268; 6,329,925; 5,668,663; 5,530,240 and/or 5,724,187, and/or in U.S. Publication No. US-2006-0050018, which are all hereby incorporated herein by reference in their entireties. The display may be viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like.

Changes and modifications to the specifically described embodiments may be carried out without departing from the principles of the present invention, which is intended to be limited only by the scope of the appended claims as interpreted according to the principles of patent law.

The invention claimed is:

1. A vehicular display system comprising:
an electronic control unit (ECU) disposed at a vehicle equipped with the vehicular display system, wherein the ECU comprises electronic circuitry and associated software;
a plurality of cameras disposed at the vehicle, wherein the plurality of cameras comprises at least six cameras;
wherein the plurality of cameras comprises (i) a rear backup camera, (ii) a forward viewing camera disposed at a front portion of the vehicle and viewing forward of the vehicle, (iii) a driver-side side viewing camera disposed at a driver-side exterior rearview mirror assembly at a driver side of the vehicle and viewing sideward of the driver side of the vehicle, (iv) a passenger-side side viewing camera disposed at a passenger-side exterior rearview mirror assembly at a passenger side of the vehicle and viewing sideward of the passenger side of the vehicle, (v) a driver-side rear corner camera disposed at a driver-side rear corner region of the vehicle and viewing at least sideward of the driver side of the vehicle, and (vi) a passenger-side rear corner camera disposed at a passenger-side rear corner region of the vehicle and viewing at least sideward of the passenger side of the vehicle;
wherein the plurality of cameras capture image data, and wherein the image data captured by the plurality of cameras is provided to the ECU;
wherein the electronic circuitry of the ECU comprises an image processor operable to process image data captured by any individual camera of the plurality of cameras;
a video mirror display screen disposed at an interior rearview mirror assembly of the vehicle and viewable by a driver of the vehicle;
wherein the ECU, responsive to processing of captured image data provided to the ECU, generates video images, and wherein the generated video images are provided to the video mirror display screen for display at the video mirror display screen;
wherein, during a reversing maneuver of the vehicle, the ECU, via processing of image data captured by the rear backup camera of the plurality of cameras, generates rear view video images and provides the rear view video images to the video mirror display screen;
wherein, during a parking maneuver of the vehicle, the ECU, via processing of image data captured by the rear backup camera, the forward viewing camera, the driver-side side viewing camera and the passenger-side side viewing camera of the plurality of cameras, generates bird's-eye view video images and provides the bird's-eye view video images to the video mirror display screen;
wherein, responsive to a triggering event, the ECU, via processing of image data captured by at least one of the driver-side rear corner camera and the passenger-side rear corner camera of the plurality of cameras, generates cross-traffic view video images and provides the cross-traffic view video images to the video mirror display screen;
wherein the video mirror display screen displays the video images provided by the ECU to the video mirror display screen;
wherein the cross-traffic view video images are displayed at the video mirror display screen in a split-screen format, with a driver-side corner view displayed at a left display region of the video mirror display screen and a passenger-side corner view displayed at a right display region of the video mirror display screen;
a driver-side front corner camera disposed at a driver-side front corner region of the vehicle and viewing at least sideward of the driver side of the vehicle;
a passenger-side front corner camera disposed at a passenger-side front corner region of the vehicle and viewing at least sideward of the passenger side of the vehicle;
wherein, responsive to a second triggering event, the ECU, via processing of image data captured by at least one of the driver-side front corner camera and the passenger-side front corner camera, generates front cross-traffic view video images and provides the front cross-traffic view video images to the video mirror display screen;

wherein the second triggering event comprises determination that the vehicle is commencing an unparking maneuver where the vehicle is driving forward out of a parking space; and wherein the front cross-traffic view video images cease to be displayed at the video mirror display screen responsive to determination that the vehicle is traveling above a threshold speed.

2. The vehicular display system of claim 1, wherein the triggering event comprises determination that the vehicle is commencing an unparking maneuver where the vehicle is reversing out of a parking space.

3. The vehicular display system of claim 1, wherein the video mirror display screen displays the rear view video images at a central display region of the video mirror display screen between the left display region and the right display region.

4. The vehicular display system of claim 1, wherein the triggering event comprises determination of presence of an object in a field of view of at least one selected from the group consisting of (i) the driver-side rear corner camera and (ii) the passenger-side rear corner camera, and wherein the split-screen format includes the driver-side corner view responsive to determination of presence of the object in the field of view of the driver-side rear corner camera and the split-screen format includes the passenger-side corner view responsive to determination of presence of the object in the field of view of the passenger-side rear corner camera.

5. The vehicular display system of claim 1, wherein the triggering event comprises a determination that an object is at or near or approaching a predicted path of travel of the vehicle.

6. The vehicular display system of claim 1, wherein the triggering event comprises at least one selected from the group consisting of (i) selection of a reverse gear at a gear selector of the vehicle, and (ii) actuation of a user actuatable input.

7. The vehicular display system of claim 1, wherein the driver-side rear corner camera is disposed at a driver-side taillight of the vehicle, and wherein the passenger-side rear corner camera is disposed at a passenger-side taillight of the vehicle.

8. The vehicular display system of claim 1, wherein the plurality of cameras comprises at least one camera monitoring system (CMS) camera disposed at the vehicle, and wherein the at least one CMS camera comprises a rearward viewing CMS camera that has a different field of view than the rear backup camera, and wherein, during a forward driving maneuver of the vehicle along a road, the ECU, via processing of image data captured by the rearward viewing CMS camera, generates CMS rear view video images and provides the CMS rear view video images to the video mirror display screen.

9. The vehicular display system of claim 8, wherein the at least one CMS camera comprises side rearward viewing CMS cameras disposed at respective exterior rearview mirror assemblies at the respective sides of the vehicle.

10. The vehicular display system of claim 8, wherein the rearward viewing CMS camera is centrally disposed at the vehicle at a height above the rear backup camera.

11. A vehicular display system comprising:

an electronic control unit (ECU) disposed at a vehicle equipped with the vehicular display system, wherein the ECU comprises electronic circuitry and associated software;

a plurality of cameras disposed at the vehicle, wherein the plurality of cameras comprises at least eight cameras;

wherein the plurality of cameras comprises (i) a rear backup camera, (ii) a forward viewing camera disposed at a front portion of the vehicle and viewing forward of the vehicle, (iii) a driver-side side viewing camera disposed at a driver-side exterior rearview mirror assembly at a driver side of the vehicle and viewing sideward of the driver side of the vehicle, (iv) a passenger-side side viewing camera disposed at a passenger-side exterior rearview mirror assembly at a passenger side of the vehicle and viewing sideward of the passenger side of the vehicle, (v) a driver-side rear corner camera disposed at a driver-side rear corner region of the vehicle and viewing at least sideward of the driver side of the vehicle, (vi) a passenger-side rear corner camera disposed at a passenger-side rear corner region of the vehicle and viewing at least sideward of the passenger side of the vehicle, (vii) a driver-side front corner camera disposed at a driver-side front corner region of the vehicle and viewing at least sideward of the driver side of the vehicle, and (viii) a passenger-side front corner camera disposed at a passenger-side front corner region of the vehicle and viewing at least sideward of the passenger side of the vehicle;

wherein the plurality of cameras capture image data, and wherein the image data captured by the plurality of cameras is provided to the ECU;

wherein the electronic circuitry of the ECU comprises an image processor operable to process image data captured by any individual camera of the plurality of cameras;

a video mirror display screen disposed at an interior rearview mirror assembly of the vehicle and viewable by a driver of the vehicle;

wherein the ECU, responsive to processing of captured image data provided to the ECU, generates video images, and wherein the generated video images are provided to the video mirror display screen for display at the video mirror display screen;

wherein, during a reversing maneuver of the vehicle, the ECU, via processing of image data captured by the rear backup camera of the plurality of cameras, generates rear view video images and provides the rear view video images to the video mirror display screen;

wherein, during a parking maneuver of the vehicle, the ECU, via processing of image data captured by the rear backup camera, the forward viewing camera, the driver-side side viewing camera and the passenger-side side viewing camera of the plurality of cameras, generates bird's-eye view video images and provides the bird's-eye view video images to the video mirror display screen;

wherein, responsive to at least one first triggering event, the ECU, via processing of image data captured by at least one of the driver-side rear corner camera and the passenger-side rear corner camera of the plurality of cameras, generates rear cross-traffic view video images and provides the rear cross-traffic view video images to the video mirror display screen;

wherein, responsive to at least one second triggering event, the ECU, via processing of image data captured by at least one of the driver-side front corner camera and the passenger-side front corner camera of the plurality of cameras, generates front cross-traffic view video images and provides the front cross-traffic view video images to the video mirror display screen;

wherein the video mirror display screen displays the video images provided by the ECU to the video mirror display screen;

wherein the rear cross-traffic view video images are displayed at the video mirror display screen in a split-screen format, with a driver-side rear corner view displayed at a left display region of the video mirror display screen and a passenger-side rear corner view displayed at a right display region of the video mirror display screen;

wherein the front cross-traffic view video images are displayed at the video mirror display screen in the split-screen format, with a driver-side front corner view displayed at the left display region of the video mirror display screen and a passenger-side front corner view displayed at the right display region of the video mirror display screen;

wherein the at least one first triggering event comprises determination that the vehicle is commencing a rearward unparking maneuver where the vehicle is reversing out of a parking space;

wherein the at least one second triggering event comprises determination that the vehicle is commencing a forward unparking maneuver where the vehicle is driving forward out of the parking space; and wherein the front cross-traffic view video images cease to be displayed at the video mirror display screen responsive to determination that the vehicle is traveling above a threshold speed.

12. The vehicular display system of claim 11, wherein the video mirror display screen displays the rear view video images at a central display region of the video mirror display screen between the left display region and the right display region.

13. The vehicular display system of claim 11, wherein the at least one first triggering event comprises determination of presence of an object in a field of view of at least one selected from the group consisting of (i) the driver-side rear corner camera and (ii) the passenger-side rear corner camera, and wherein the split-screen format includes the driver-side rear corner view responsive to determination of presence of the object in the field of view of the driver-side rear corner camera and the split-screen format includes the passenger-side rear corner view responsive to determination of presence of the object in the field of view of the passenger-side rear corner camera.

14. The vehicular display system of claim 11, wherein the at least one second triggering event comprises determination of presence of an object in a field of view of at least one selected from the group consisting of (i) the driver-side front corner camera and (ii) the passenger-side front corner camera, and wherein the split-screen format includes the driver-side front corner view responsive to determination of presence of the object in the field of view of the driver-side front corner camera and the split-screen format includes the passenger-side front corner view responsive to determination of presence of the object in the field of view of the passenger-side front corner camera.

15. The vehicular display system of claim 11, wherein the at least one first triggering event comprises a determination that an object is at or near or approaching a predicted rearward path of travel of the vehicle, and wherein the at least one second triggering event comprises a determination that an object is at or near or approaching a predicted forward path of travel of the vehicle.

16. A vehicular display system comprising:

an electronic control unit (ECU) disposed at a vehicle equipped with the vehicular display system, wherein the ECU comprises electronic circuitry and associated software;

a plurality of cameras disposed at the vehicle, wherein the plurality of cameras comprises at least seven cameras;

wherein the plurality of cameras comprises (i) a rear backup camera, (ii) a forward viewing camera disposed at a front portion of the vehicle and viewing forward of the vehicle, (iii) a driver-side side viewing camera disposed at a driver-side exterior rearview mirror assembly at a driver side of the vehicle and viewing sideward of the driver side of the vehicle, (iv) a passenger-side side viewing camera disposed at a passenger-side exterior rearview mirror assembly at a passenger side of the vehicle and viewing sideward of the passenger side of the vehicle, (v) at least one camera monitoring system (CMS) camera disposed at the vehicle, (vi) a driver-side rear corner camera disposed at a driver-side rear corner region of the vehicle and viewing at least sideward of the driver side of the vehicle, and (vii) a passenger-side rear corner camera disposed at a passenger-side rear corner region of the vehicle and viewing at least sideward of the passenger side of the vehicle;

wherein the at least one CMS camera comprises a rearward viewing CMS camera that has a different field of view than the rear backup camera, and wherein the rearward viewing CMS camera is centrally disposed at the vehicle at a height above the rear backup camera;

wherein the plurality of cameras capture image data, and wherein the image data captured by the plurality of cameras is provided to the ECU;

wherein the electronic circuitry of the ECU comprises an image processor operable to process image data captured by any individual camera of the plurality of cameras;

a video mirror display screen disposed at an interior rearview mirror assembly of the vehicle and viewable by a driver of the vehicle;

wherein the ECU, responsive to processing of captured image data provided to the ECU, generates video images, and wherein the generated video images are provided to the video mirror display screen for display at the video mirror display screen;

wherein, during a reversing maneuver of the vehicle, the ECU, via processing of image data captured by the rear backup camera of the plurality of cameras, generates rear view video images and provides the rear view video images to the video mirror display screen;

wherein, during a forward driving maneuver of the vehicle along a road, the ECU, via processing of image data captured by the rearward viewing CMS camera, generates CMS rear view video images and provides the CMS rear view video images to the video mirror display screen;

wherein, during a parking maneuver of the vehicle, the ECU, via processing of image data captured by the rear backup camera, the forward viewing camera, the driver-side side viewing camera and the passenger-side side viewing camera of the plurality of cameras, generates bird's-eye view video images and provides the bird's-eye view video images to the video mirror display screen;

wherein, responsive to a first triggering event, the ECU, via processing of image data captured by at least one of the driver-side rear corner camera and the passenger-side rear corner camera of the plurality of cameras, generates cross-traffic view video images and provides the cross-traffic view video images to the video mirror display screen;

wherein the video mirror display screen displays the video images provided by the ECU to the video mirror display screen;

wherein the cross-traffic view video images are displayed at the video mirror display screen in a split-screen format, with a driver-side corner view displayed at a left display region of the video mirror display screen and a passenger-side corner view displayed at a right display region of the video mirror display screen;

wherein the video mirror display screen displays the rear view video images at a central display region of the video mirror display screen between the left display region and the right display region;

wherein the plurality of cameras further comprises (i) a driver-side front corner camera disposed at a driver-side front corner region of the vehicle and viewing at least sideward of the driver side of the vehicle, and (ii) a passenger-side front corner camera disposed at a passenger-side front corner region of the vehicle and viewing at least sideward of the passenger side of the vehicle;

wherein, responsive to a second triggering event, the ECU, via processing of image data captured by at least one of the driver-side front corner camera and the passenger-side front corner camera, generates front cross-traffic view video images and provides the front cross-traffic view video images to the video mirror display screen;

wherein the second triggering event comprises determination that the vehicle is commencing an unparking maneuver where the vehicle is driving forward out of a parking space; and wherein the front cross-traffic view video images cease to be displayed at the video mirror display screen responsive to determination that the vehicle is traveling above a threshold speed.

17. The vehicular display system of claim 16, wherein the first triggering event comprises determination of presence of an object in a field of view of at least one selected from the group consisting of (i) the driver-side rear corner camera and (ii) the passenger-side rear corner camera, and wherein the split-screen format includes the driver-side corner view responsive to determination of presence of the object in the field of view of the driver-side rear corner camera and the split-screen format includes the passenger-side corner view responsive to determination of presence of the object in the field of view of the passenger-side rear corner camera.

18. The vehicular display system of claim 16, wherein the at least one CMS camera comprises side rearward viewing CMS cameras disposed at respective exterior rearview mirror assemblies at the respective sides of the vehicle.

\* \* \* \* \*